United States Patent
Crump et al.

(10) Patent No.: US 11,124,961 B2
(45) Date of Patent: *Sep. 21, 2021

(54) SYSTEM AND METHOD FOR 3D CONSTRUCTION PRINTING

(71) Applicant: Stratasys, Inc., Eden Prairie, MN (US)

(72) Inventors: S. Scott Crump, Wayzata, MN (US); J. Samuel Batchelder, Somers, NY (US); Susan M Hayes Jacobson, Edina, MN (US)

(73) Assignee: Stratasys, Inc., Eden Prairie, MN (US)

( * ) Notice: Subject to any disclaimer, the term of this patent is extended or adjusted under 35 U.S.C. 154(b) by 407 days.

This patent is subject to a terminal disclaimer.

(21) Appl. No.: 16/188,892

(22) Filed: Nov. 13, 2018

(65) Prior Publication Data
US 2020/0149269 A1    May 14, 2020

(51) Int. Cl.
*E04B 1/35* (2006.01)
*B28B 1/00* (2006.01)
(Continued)

(52) U.S. Cl.
CPC ............ *E04B 1/3505* (2013.01); *B28B 1/001* (2013.01); *B29C 64/106* (2017.08);
(Continued)

(58) Field of Classification Search
CPC ... B29C 64/106; B29C 64/118; B29C 64/194; B29C 64/393; B28B 1/001; B28B 23/0006; B28B 23/04; B28B 23/043; E04B 1/3505
See application file for complete search history.

(56) References Cited

U.S. PATENT DOCUMENTS

| 7,153,454 | B2 | 12/2006 | Khoshnevis |
| 7,814,937 | B2 | 10/2010 | Khoshnevis |

(Continued)

FOREIGN PATENT DOCUMENTS

| CN | 108215178 A | 6/2018 |
| DE | 102016214187 A1 | 2/2018 |

(Continued)

OTHER PUBLICATIONS

International Search Report and Written Opinion, PCT/US2019/0660941, dated May 27, 2020, 38 pages.

(Continued)

*Primary Examiner* — Mary Lynn F Theisen
(74) *Attorney, Agent, or Firm* — Peter J. Ims; Westman, Champlin & Koehler, P.A.

(57) ABSTRACT

A large-scale additive manufacturing system for printing a structure includes an extrusion system and a knitting system. The extrusion system includes a nozzle configured to receive a supply of structural material and to selectively dispense the structural material in flowable form, and a first gantry configured to move the nozzle along toolpaths defined according to a structure to be printed such that structural material may be dispensed along the toolpaths to print a series of structural layers, wherein the series of structural layers bond together to form all or a portion of the structure. The knitting system includes a tow feeder configured to feed a supply of tow material to a location proximate a current course of loops extending above an upper surface of a current structural layer or extending above a base surface in regions where no structural layer has been printed, and a hooking device configured to engage the tow material and bring it through the current course of loops to form a subsequent course of loops interwoven with the current course of loops. A controller is configured to operate the (Continued)

knitting system to form additional subsequent courses of loops each interwoven with a current course of loops after each of the series of structural layers are printed, wherein the interwoven courses of loops create a reinforcement network of knitted loops embedded in the structure, and wherein the series of structural layers are tied together.

36 Claims, 6 Drawing Sheets

(51) Int. Cl.
  *B29C 64/106* (2017.01)
  *B29C 64/118* (2017.01)
  *B33Y 10/00* (2015.01)
  *B33Y 30/00* (2015.01)
  *B33Y 50/02* (2015.01)
  *B33Y 70/00* (2020.01)
  *B33Y 80/00* (2015.01)
  *D04B 15/48* (2006.01)
  *D04B 15/66* (2006.01)

(52) U.S. Cl.
  CPC .............. *B29C 64/118* (2017.08); *B33Y 10/00* (2014.12); *B33Y 30/00* (2014.12); *B33Y 50/02* (2014.12); *B33Y 70/00* (2014.12); *B33Y 80/00* (2014.12); *D04B 15/48* (2013.01); *D04B 15/66* (2013.01); *D10B 2505/02* (2013.01)

(56) References Cited

U.S. PATENT DOCUMENTS

| | | |
|---|---|---|
| 7,841,849 B2 | 11/2010 | Khoshnevis |
| 7,850,388 B2 | 12/2010 | Khoshnevis |
| 7,874,825 B2 | 1/2011 | Khoshnevis |
| 7,878,789 B2 | 2/2011 | Khoshnevis |
| 8,029,710 B2 | 10/2011 | Khoshnevis |
| 8,308,470 B2 | 11/2012 | Khoshnevis |
| 8,479,468 B1 | 7/2013 | Abbasi |
| 8,568,121 B2 | 10/2013 | Khoshnevis |
| 8,801,415 B2 | 8/2014 | Khoshnevis |
| 8,863,773 B2 | 10/2014 | Khoshnevis |
| 8,992,679 B2 | 3/2015 | Khoshnevis |
| 9,206,601 B2 | 12/2015 | Khoshnevis |
| 9,511,543 B2 | 12/2016 | Tyler |
| 9,815,268 B2 | 11/2017 | Mark et al. |
| 10,889,044 B2 * | 1/2021 | Batchelder .............. B29C 48/05 |
| 2017/0129153 A1 | 5/2017 | Koivuharju |
| 2018/0065144 A1 | 3/2018 | Tyler |
| 2018/0093446 A1 | 4/2018 | Ogale |

FOREIGN PATENT DOCUMENTS

| | | |
|---|---|---|
| KR | 101210358 B1 | 12/2012 |
| WO | 2015132157 A1 | 9/2015 |

OTHER PUBLICATIONS

Communication pursuant to Rules 161(1) and 162 EPC from European Application No. 19836190.9, dated Jun. 22, 2021.

\* cited by examiner

SYSTEM AND METHOD FOR 3D CONSTRUCTION PRINTING

BACKGROUND

The present disclosure relates to building structures in a layer-wise manner utilizing an additive manufacturing process. More particularly, the present disclosure relates to the printing of large-scale reinforced structures using an extrusion-based additive manufacturing system. All references disclosed herein are incorporated by reference.

Modern building techniques use a variety of materials to create large-scale construction structures. Concrete forms the basis for most modern large-scale structures and is used in a variety of environments to perform various support, reinforcement and structural roles. The main advantages of concrete are its strength and rigidity when compressed, and its ability to be poured or extruded as a fluid which can be easily applied and formed into structural shapes or forms. Other materials that have these properties and are used in modern building techniques include, but are not limited to, cement, resins, polymers, and ceramics.

The printing of large-scale structures in a layer-wise manner using additive manufacturing techniques may be referred to as 3D construction printing (3DCP). Techniques for 3D construction printing typically extrude flowable build material in a layer-wise manner from an extruder or pumping nozzle carried on a gantry or robotic arm and moved in 2D (i.e., planar) or 3D toolpaths. The build material exiting the nozzle typically takes a form that is complimentary to the shape of the nozzle exit. The extruded elements of build material may be referred to as extruded roads, stacked extrudate, or slabs. The extruded elements bond together at their interface surfaces. In a typical layer-wise construction of concrete structures, a concrete pumping system utilizes a nozzle of a size that allows for printing of structural walls by vertical stacking of a single column of concrete slabs. In these printed concrete structures, most of the interfaces occur in a horizontal (x-y) plane.

The strength of a 3D printed structure typically is directionally dependent or anisotropic. Anisotropy may occur both in the bulk material, and as a consequence of interfaces between printed elements or layers. Typically, the strength of the interfaces will govern the overall structural performance, because the strength of the bond at the interface of two elements or concrete slabs will be less than the strength of the bulk material. As such, a typical 3D printed structure has less strength in the z direction (substantially perpendicular to planar layer interfaces) relative to the strength in the x and y directions.

In traditional manufacturing methods, the inherent weakness of concrete is overcome using rebar as reinforcement. The rebar typically has a lattice or a parallel arrangement at regular spaced intervals to provide uniform strength properties to the structure. The rebar is placed in a concrete mold before the filling of the mold to form a foundation slab, so that the concrete may fill around the rebar without disturbance after insertion. In creating 3D printed structures using layer-wise extrusion, this manner of using rebar is problematic because an extruder must avoid collision with the pre-set rebar. The addition of fibers to a concrete mixture can also be used to create a stronger internal network throughout the bulk material, but does not add significant strength between layer. A need exists for techniques that can be used to increase the z-strength of large-scale 3D printed structures, such as those printed from concrete.

SUMMARY

An aspect of the present disclosure is directed to a large-scale additive manufacturing system for printing a structure includes an extrusion system and a knitting system. The extrusion system includes a nozzle configured to receive a supply of structural material and to selectively dispense the structural material in flowable form, and a first gantry configured to move the nozzle along toolpaths defined according to a structure to be printed such that structural material may be dispensed along the toolpaths to print a series of structural layers, wherein the series of structural layers bond together to form all or a portion of the structure. The knitting system includes a tow feeder configured to feed a supply of tow material to a location proximate a current course of loops extending above an upper surface of a current structural layer or extending above a base surface in regions where no structural layer has been printed, and a hooking device configured to engage the tow material and bring it through the current course of loops to form a subsequent course of loops interwoven with the current course of loops. A controller is configured to operate the knitting system to form additional subsequent courses of loops each interwoven with a current course of loops after each of the series of structural layers are printed, wherein the interwoven courses of loops create a reinforcement network of knitted loops embedded in the structure, and wherein the series of structural layers are tied together.

Another aspect of the present disclosure is directed to a knitting system configured to be utilized with a large-scale extrusion-based additive manufacturing system for printing a structure in a layer-by-layer manner. The knitting system includes a tow feeder configured to feed a supply of tow material to a location proximate a current course of loops extending above a current structural layer of the structure being printed or extending above a base surface in regions where no structural layer has been printed, and a hooking device configured to engage the tow material and bring it through the current course of loops to form a subsequent course of loops interwoven with the current course of loops. The tow feeder and hooking device are configured to be moved based upon signals from a controller to form additional subsequent courses of loops each interwoven with a current course of loops as each structural layer is printed, wherein the interwoven courses of loops create a reinforcement network of knitted loops embedded in the structure.

Another aspect of the present disclosure is directed to a method of printing a large-scale structure in a layer-wise manner. The method includes providing an existing course of loops, and printing a layer of a structure by extruding one or more flowable structural materials about the existing course of loops such that an upper surface of the layer is at a selected height on the existing course of loops. The method includes knitting a next course of loops to the existing course of loops to form a portion of an internal woven reinforcement network, and printing a next layer of the structure by extruding one or more structural flowable materials about the next course of loops such that an upper surface of the next layer is at a selected height on the next course of loops, wherein the next course of loops extends above the structure being printed and may function as an existing course of loops for subsequent knitting steps. Thee knitting and printing steps are repeated to create an internal woven reinforcement network within the printed structure.

Another aspect of the present disclosure is directed to a method of printing a large-scale structure in a layer-wise manner. The method includes providing a first course of loops, and feeding a tow material through the first loop of the first course of loops using a hooking device to create a knitted loop. The method includes covering the tow material with a layer of flowable material and embedding the loop while maintaining exposure of the upper portion of the first knitted loop for a subsequent knitted loop, and forming a second course of loops knitted to the first course of loops to form a portion of a woven reinforcement network. The method further includes printing additional layers of the structure about the second course of loops such that an upper surface of the structure is at a selected height on the next course of loops. The steps are repeated to create an embedded reinforcement network within the structure.

DETAILED DESCRIPTION

Figure 1:
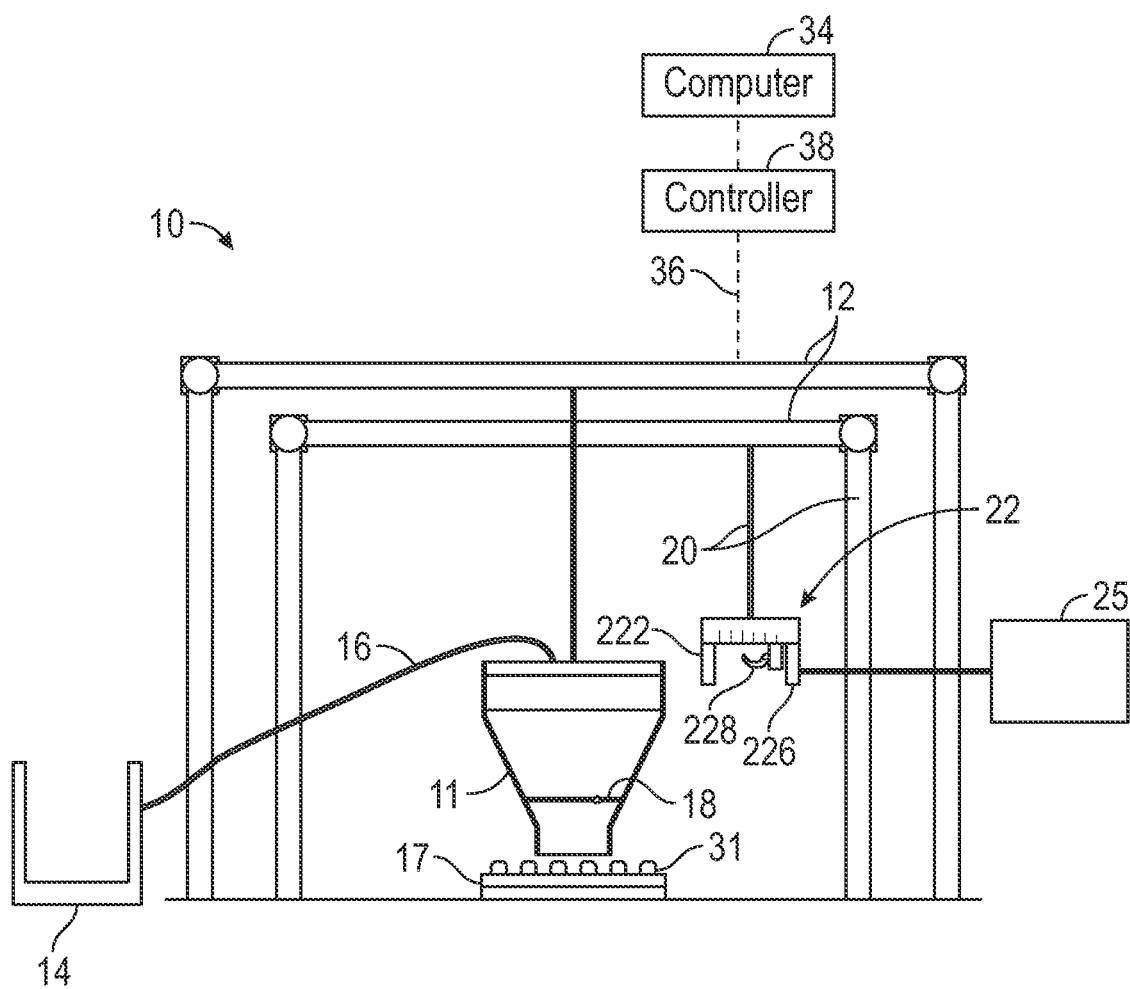
FIG. 1 is a front view of an additive manufacturing system configured to print parts with one or more internal woven panels.

The present disclosure is directed to a device and method for layer-wise 3D printing of a large-scale structure, concurrently with creating an embedded reinforcement network that spans a plurality of layers forming the structure using a reinforcement filament. The reinforcement network is created using a looping or knitting device to knit together layers or courses of looped material, such that at least a portion of the upper-most course of loops extend above the layers of structural material as the layer of the structure is extruded. In this manner, the reinforcement network interconnects the structural material layers in an interlayer fashion, increasing the strength of the printed structure in a direction (z-direction) substantially normal to the printed layers.

While the printing of concrete structures on a large scale are discussed in the present disclosure, the present disclosure is not limited to the printing of concrete. Rather, any material that flows and then sets up or cures in a relatively short amount of time can be utilized. Exemplary, but non-limiting, materials include cements, resins, polymers, and ceramics.

The present disclosure utilizes a supply of reinforcement filament(s) that is woven into a structure that extends between the layers of the extrudate by forming courses of interwoven loops or periodic loops that extend above the extruded layer. The course of loops or periodic loops are used for interconnection to a subsequent layer of the woven structure, thus resulting in an inter-layer reinforcement network of filament within the printed structure. The interwoven structure can be formed by knitting loops in a unidirectional manner or pearled in a bidirectional manner.

The fabrication process of making the reinforcement network by creating a series of interconnecting periodic loops or courses of loops utilizes a process that is similar to 'knitting' of textiles. Thus, the fabrication of courses of loops or periodic loops will be referred to as knitting going forward in this application.

The periodic loops or courses of loops are formed as the structure is printed in the layer-wise manner to prevent the knitted reinforcement network from interfering with the movement of the extrusion nozzle during the printing operation. It is typically not possible to utilize a pre-woven reinforcement panel or fabric-like mesh when printing a concrete structure with an additive manufacturing system because the length of the woven panel extending above the previously printed layer would interfere with the movement of the nozzle. For a large or tall structure, a height of a pre-woven panel would be difficult to manipulate to a location that does not interfere with the printing of a layer of the layer(s) of build material, such as concrete.

The present disclosure including the knitting of courses or layers in a large-scale structure substantially in a z direction (inter-layer) as the structure is printed in a layer-wise manner. The present disclosure includes knitting looped courses while the structure is printed such that a selected number of looped courses or portions of periodic loops extend above the upper surface of the structure. By forming the reinforcement network as the large-scale structure is printed, the present disclosure avoids the complication that would otherwise be experienced when trying to incorporate a pre-existing rebar mesh network as the extrusion nozzle is moved without interference throughout the course.

The courses can be knitted as the structure is printed such that the knitted reinforcement network extends from proximate a bottom layer of the structure to proximate a top layer of the structure. Because the knitted reinforcement network extends through the layers of the concrete structure, the knitted reinforcement network increases the strength of the concrete structure in a direction substantially normal to the printed layers relative to structures printed without the knitted structure.

In some embodiments, the structure being printed is subjected to vibration. Utilizing vibration removes voids from the material and improves encapsulation of the knitted reinforcement network with in the structure.

Optionally, the knitted courses can be placed into tension prior to the layers completely setting. With the use of optional tensioning during the printing of a concrete structure, the printed concrete structure may have substantially equivalent strength as that of pre-stressed concrete structure, which enhances the resistance to the effects of impact and shock of external vibrations, whether environmental or manmade.

Additive manufacturing systems for printing concrete structures in a layer-wise manner utilize a nozzle connected to a source of concrete. Depending upon the size of the desired structure, the nozzle can be carried by a robotic arm, a crane or a gantry supported by a structure located about the structure being printed. A controller controls the movement of the nozzle and flow of concrete through the nozzle based upon a sliced digital representation of the structure. Exemplary additive manufacturing system for printing concrete structures in a layer-wise manner include Khoshnevis U.S. Pat. Nos. 8,992,679, 7,850,388, 8,801,415, 7,814,937, 7,841,849, 8,308,470, 8,863,773, 8,029,710, 7,878,789, 7,153,454, 7,874,825 and 8,568,121.

FIG. 1 is a schematic view of an exemplary additive manufacturing system 10 for printing a large-scale structure with an interlayer, reinforcement network. As shown in FIG. 1, system 10 includes a gantry 12 that moves an extrusion nozzle 11 in x, y and z. System 10 includes a supply 14 of flowable material, such as concrete, that is coupled to the extrusion nozzle 11 with a flexible feeding hose 16. A pump can be utilized to provide a desired flow of concrete to the nozzle 11 and a valve 18 proximate the nozzle 11 is manipulated to control a flow of concrete through the nozzle 11 to print the structure 17 in a layer-wise manner. Due to the viscosity and texture of concrete, typical extruded layer thickness being used in the industry range from about ¼" to about 3", depending on geometric configurations for the structure being printing.

The system 10 includes knitting mechanism 20 that is carried by a knitting mechanism gantry 22, whether a robot arm, crane or a gantry supported by a structure, that move the knitting mechanism 20 in x, y and z. The knitting mechanism gantry 22 can be separate from the gantry 12, or the gantry 12 can also carry the knitting mechanism 20. The knitting mechanism 20 can be provided with the additive manufacturing system 10 or provided as an accessory to the system 10.

A reinforcement material supply 25, such as wire wound on a spool or reel, provides material to the knitting mechanism 20 such that an interlayer reinforcement network 31 can be knitted as the structure 17 is printed. Depending upon the configuration of the system, the supply of material 25 can be carried by the knitting mechanism gantry 22, the gantry 12 or can be located a distance from either gantry 12 or 22.

The system 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with gantry 12, valve 18, knitting mechanism 20 and optionally knitting mechanism gantry 22 and various sensors, calibration devices, display devices, and/or user input devices.

System 10 and/or controller 34 can also communicate with computer 38, which can include one or more discrete computer-based systems that communicate with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system components, typically through controller 34, to perform printing operations.

A digital model representative of a structure to be printed can be created by drawing a structure using a computer-aided design (CAD) program. The regions of the digital model that are to be reinforced by a reinforcing network are divided into panels of low curvature. The woven reinforcement network is typically normal to the sliced layers, but can at an angle relative to the sliced layers. The digital representation is sliced and prepared for FDM fabrication as per standard additive manufacturing practices.

The digital model and/or instructions for printing the model can be loaded into computer 38. The computer 38 can communicate with controller 34, which serves to direct the system 10 to print the structure. The material is deposited in layers along toolpaths dictated by structure design requirements, and which build upon one another to form the structure. To incorporate a knitted reinforcement network, the knitting mechanism 20 forms the network to have a height that exceeds a height of the deposited material to allow the next courses of the network to be knitted while not interfering with the deposition of material.

Figure 2:
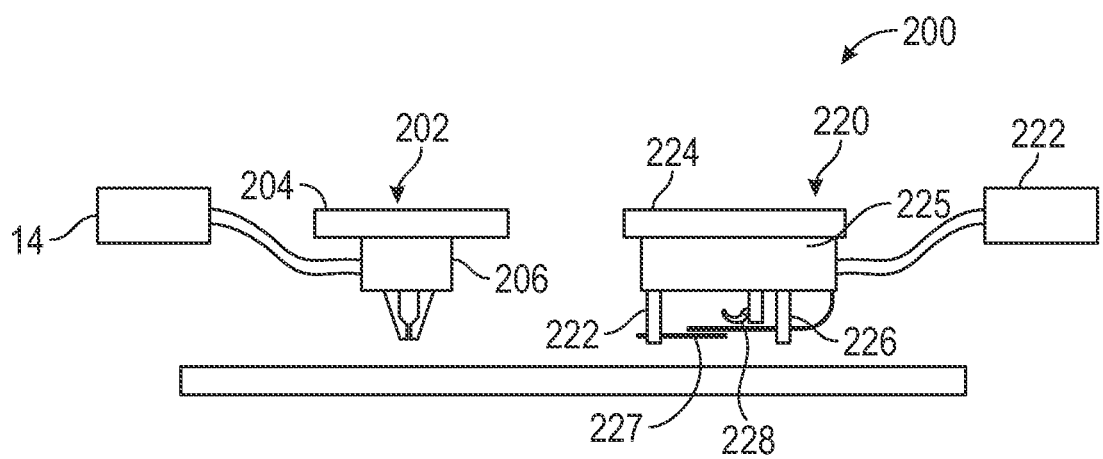
FIG. 2 is a schematic view of an extrusion system and an embodiment knitting system of an additive manufacturing system.
Figure 3:
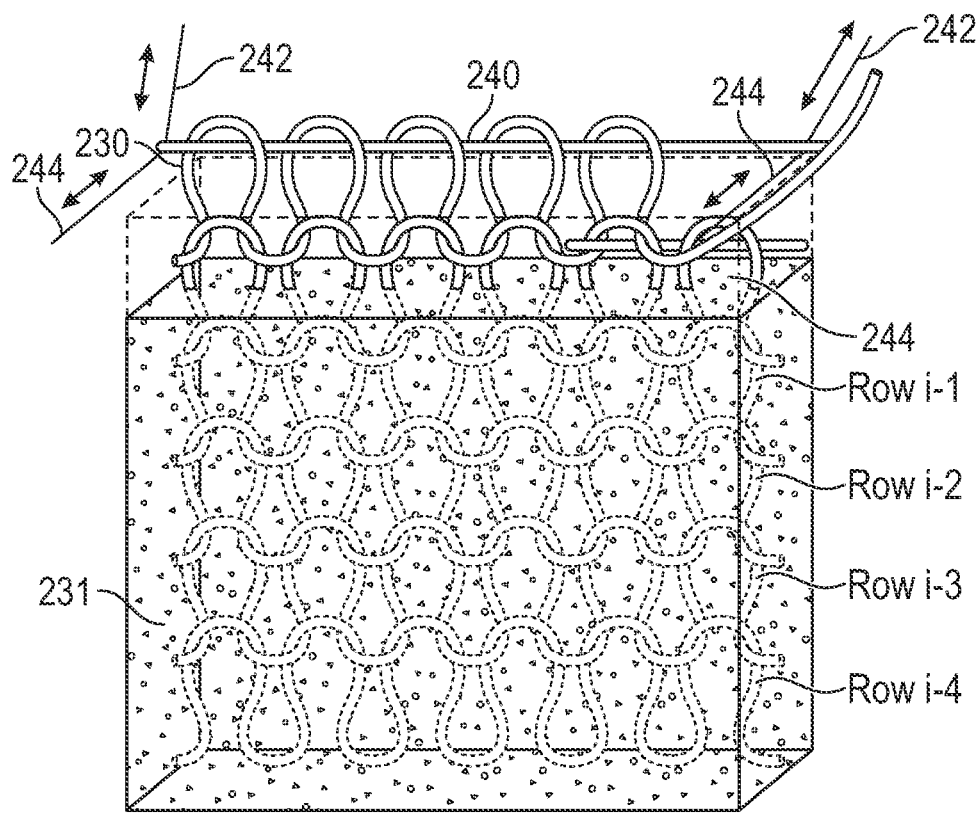
FIG. 3 is a view of part being printed along with the knitting of an internal woven panel.

An exemplary combination large-scale extrusion and reinforcement filament network knitting system is illustrated at 200 in FIG. 2 and an exemplary structure being printed with an internal reinforcement network is illustrated in FIG. 3. The system 200 includes an extrusion system 202, such as a concrete extrusion system, and a knitting system 220 which move and operate in sequence or independent of each other to print a structure in a layer-by-layer manner with one or more internal knitted reinforcement networks extending from proximate a bottom layer to proximate a top layer of the structure.

The extrusion system 202 includes a first gantry 204 that moves a nozzle 206 based upon tool paths that are generated for sliced layers, as discussed above. The nozzle 206 discharges the flowable concrete in a series of roads based upon the generated tool paths. The flowable concrete is formulated to flow from the nozzle to form a filament of a selected width and height and to cure in a sufficient amount of time to prevent deformation when additional layers of concrete are printed to form the structure.

In one embodiment, the knitting system 220 includes a source 222 of wire or tow material that is suppled to a knitting head 225 that is carried by a second gantry 224. By way of non-limited example, the source 222 of tow material may be wound on a spool or reel. The knitting head 225 includes a feeding device 226 that is utilized to feed a tow material proximate to or through a prior course of loops of a reinforcement network being knitted. Non-limiting, exemplary material that can be utilized to knit a panel include flexible metal wire, and in some instances carbon fiber where the metal wire or carbon fiber can be coated to prevent corrosion and/or make the material more compatible with the build material.

A starter row is typically inserted proximate a bottom layer of the concrete structure being printed. Non-limiting examples of the starter row (row i–4 in FIG. 3) includes pre-formed starter piece with preformed loops, or one or more preformed courses of the tow material.

A pulling device 227 pulls the tow material proximate or through the prior course of loops or loops in the starter piece. Once the tow material is positioned proximate or through the prior formed course of loops (i+1 in FIG. 3), a hook shaped device 228 engages the tow material and pulls the tow towards the second gantry 224 to form a next course of loops (i+2 in FIG. 3). The movement of the hook shaped device 228 is controlled by an actuator such as a servo motor, to form the next looped course (i+2 in FIG. 3). The number of loops in any particular row can be increased or decreased at the ends of the row.

In some instances, the ends of the row of course of tow material can be cut, such as by way of non-limiting example, by a cutter carried by the pulling device 226. The cut ends of the tow material can be clamped, knotted, glued, or woven into the fabric. In some instances, the cut ends of the tow material can be positioned within the extruded concrete such that when the extruded concrete solidifies, the ends are retained therein.

Further, the courses can be woven to provide a finished edge on each row that does not require a capturing mechanism. Finishing off a knitted 'top' row such as by crocheting, may be beneficial, to further secure the integrity of the network.

Referring to FIG. 3, as the next course of loops 230 is formed by the hook shaped device 228, a sufficiently rigid member 240 is positioned into the course of loops 230a where the sufficiently rigid member 240 is secured to cables 242, 244 that are configured to move the sufficiently rigid member 240 and therefore the course of loops 230 as the concrete structure is printed. While cables 242, 244 are illustrated and described, other actuating devices are also within the scope of the present disclosure.

What is meant by a sufficiently rigid member is that depending upon the desired function, the member can be flexible or rigid. For instance, when the member 240 is used to control the location of the loops and not place loops into tension, then a flexible member such as a wire would be sufficient. However, when the interlayer reinforcement network is to place into tension, then a rigid member can be utilized to retain the interlayer reinforcement network in tension as layers of the structure cure.

Figure 4A:
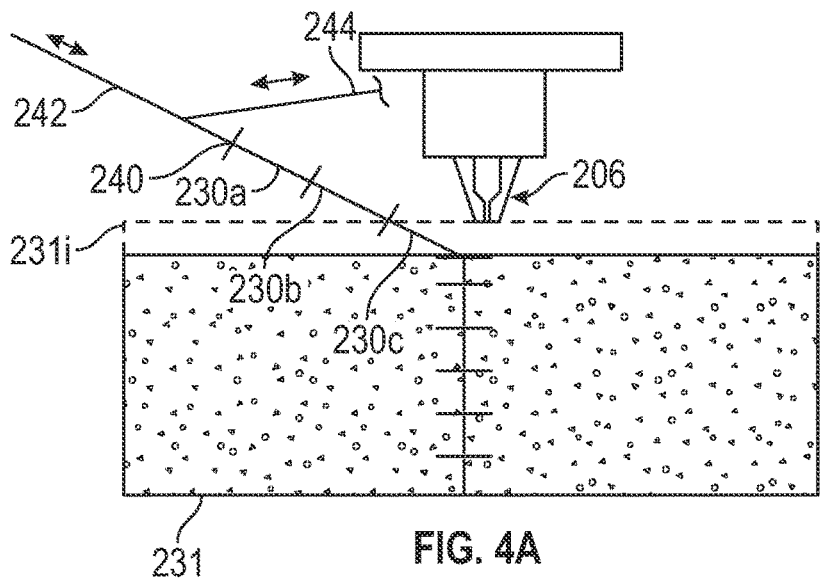
FIG. 4A is a schematic view of a part and external portion of a panel in a first position.
Figure 4B:
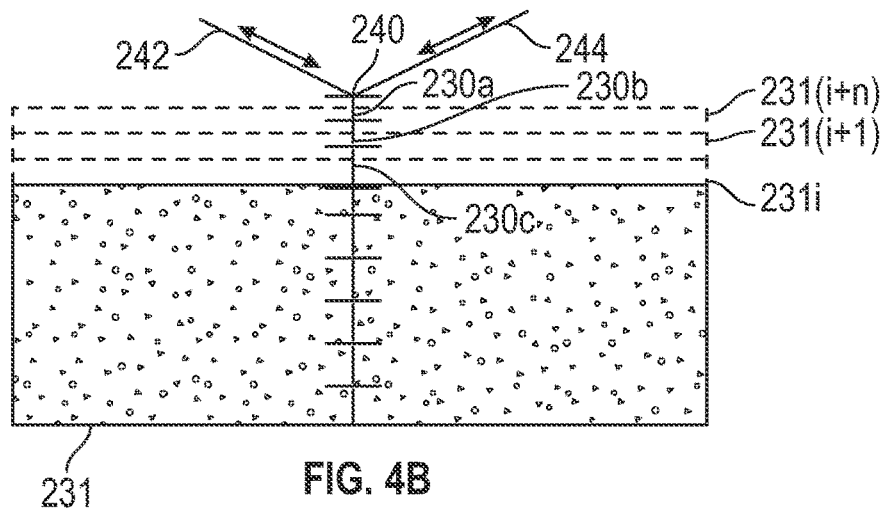
FIG. 4B is a schematic view of a part and external portion of a panel in a vertical position.
Figure 4C:
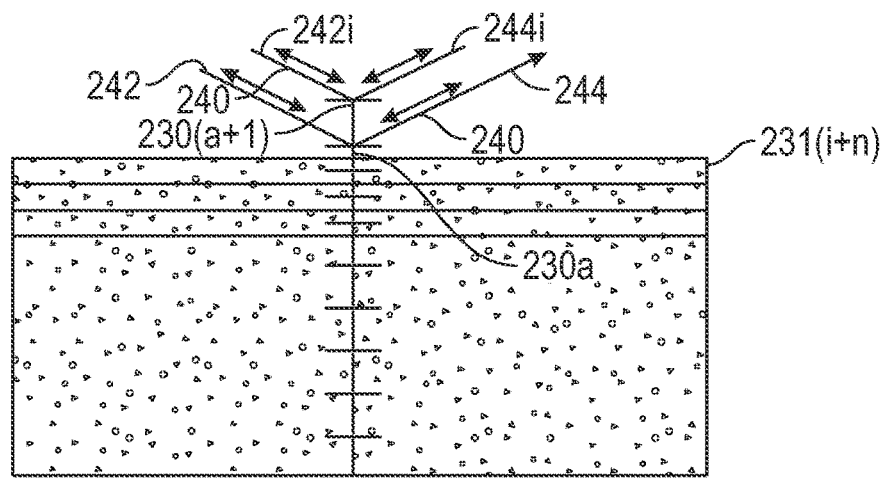
FIG. 4C is a schematic view of a top course of loops knitted into a panel above a top surface of a part being printed.

Referring to FIGS. 4A-C, the courses of loops 230a that extend above the upper surface of the part 231 being printed are manipulated to allow the nozzle 206 to print the concrete layer without interference from the courses. Referring to FIG. 4A, the cables 242 and 244 move the courses to a location where the nozzle 206 can extrude the concrete layer 231i. Once the concrete layer is printed, the cables 242 and 242 move the courses to be substantially perpendicular to an upper surface of the concrete structure being printed as illustrated in FIG. 4B.

The courses of loops 230 are manipulated as the layers of concrete are printed as illustrated in FIGS. 4A and 4B until the part reaches a selected height on the courses of loops 230a. Once the selected height is reached, the nozzle 206 is moved to a selected location, such that the cables 242 and 244 can move the course of loops 230a to a selected location where the knitting system 220 can create another course of loops 230(a+1). In some instances, the sufficiently rigid member 240 of the previously knitted course is retained in the part being printed. In other instances, the sufficiently rigid member 240 of the previously knitted course is removed from the course as the part is printed.

Once the next course of loops 230(a+1) is formed, another sufficiently rigid member 240i is positioned through the course of loops 230(a+1) and cables 242i and 244i are attached the sufficiently rigid member 240i, as illustrated in FIG. 4C.

The rigid members 240, 240i and cables 242, 242i and 244, 244i can then be used to manipulate the course of loops 230, 230i, all respectively, above the upper surface of the part 231 as the layers are printed as illustrated in FIGS. 4A and 4B. Once the part is printed on the courses, the next course of loops is then woven as illustrated in FIG. 4C. The process is repeated until the part is printed with the 3D printer.

In some instances, the ends of the row of course of tow material may be cut if desired, depending on rigidity and flexibility requirements. In some instances, the cut ends of the tow material would be internally positioned within the extruded material such that when the extruded material solidifies, the ends are retained therein.

The courses of the woven panels are un-tensioned as the layers and courses are printed and knitted, respectively. The woven panels increase the strength in a direction substantially normal to the layers, as the panels provide an interlayer connection.

In some instance, the woven panel can be placed under tension to provide a pre-tensioned or pre-stressed concrete structure. Typically, concrete slabs are pre-tensioned using metal rods that span a mold and concrete is poured into the mold and about the metal rods. The metal rods are placed under tension during the curing process. The rods remain under tension until the concrete layer cures, which provides enhanced physical properties to the concrete structure.

However, when a structure is printed in a layer-wise manner, some of the concrete layers cure as the structure is printed. It is not possible to place the completed woven network into tension in a cured concrete layer, as some of the layers of concrete are cured. However, the cure rate of the concrete is known and can be manipulated through formulation. As such, when a layer is near to being cured, the cables 242 and 244 can place an upward force on the sufficiently rigid member 240. The upward force is maintained until the layer is cured. Once the layer is cured, the portion of the woven structure will be under tension in that layer.

As such, layers of concrete can be printed and courses of woven material can be knitted and manipulated until a previous printed layer is near curing. The upward force is then placed on the rigid member 240 to place the woven panel into tension until the layer is cured. The process is repeated until the structure is printed with a panel under tension.

Figure 5:
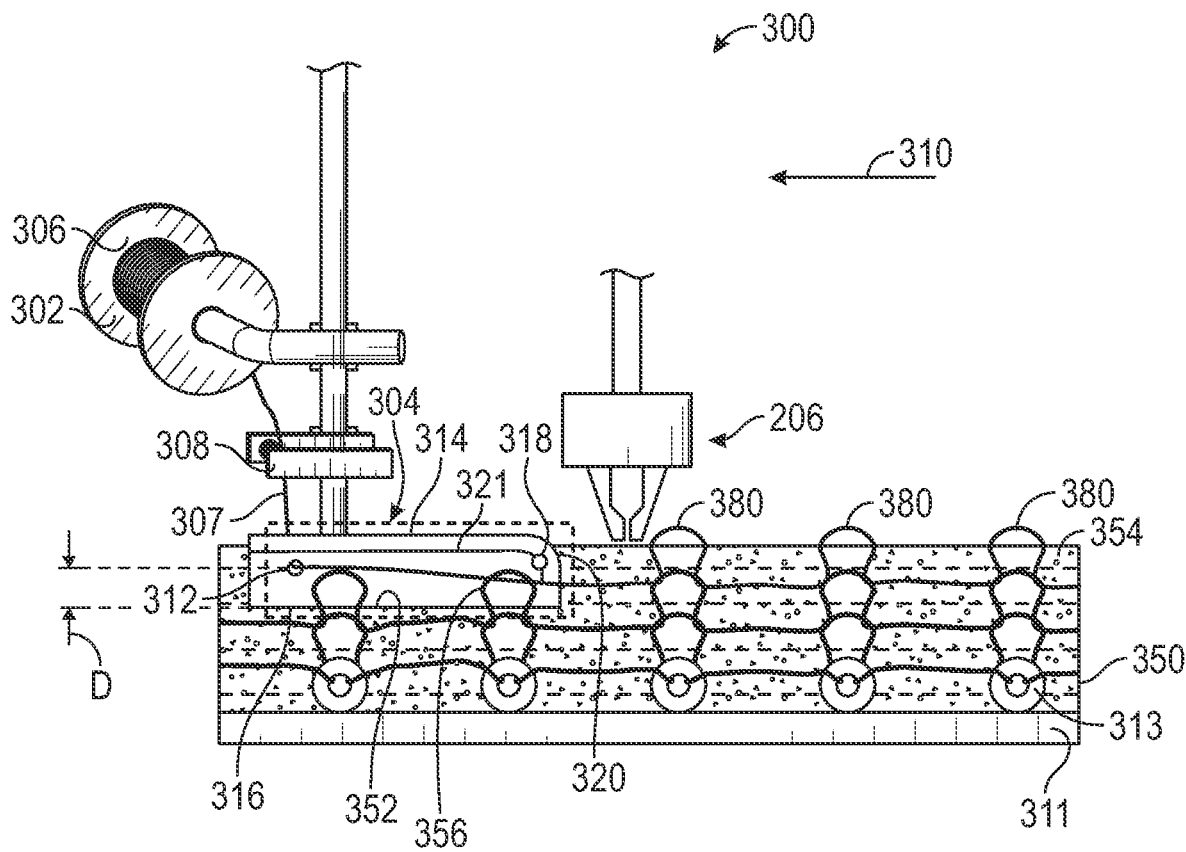
FIG. 5 is a schematic view of another knitting system of the present disclosure.
Figure 6:
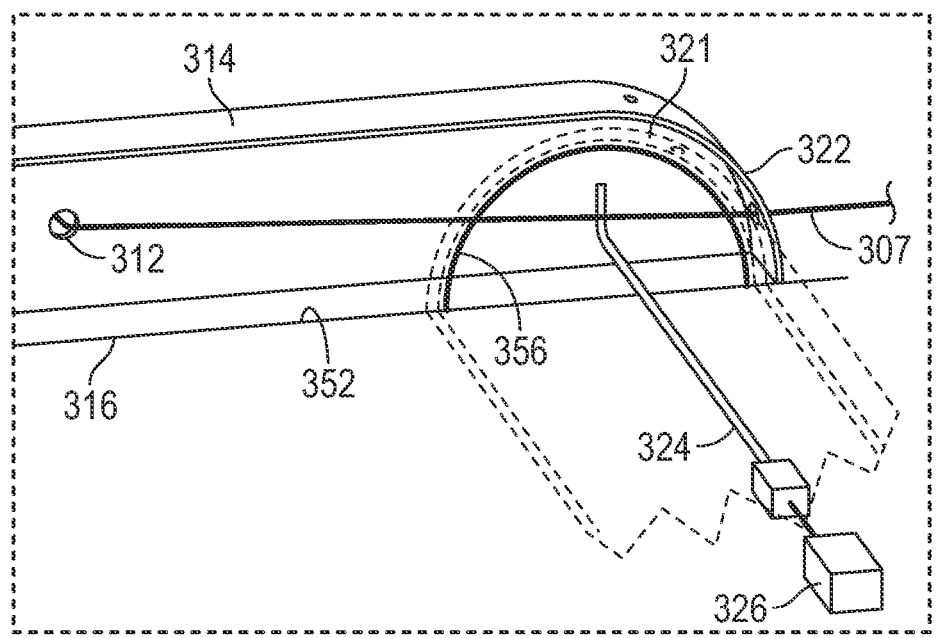
FIG. 6 is a schematic view of a loop forming portion of the knitting system illustrated in FIG. 5.
Figure 7:
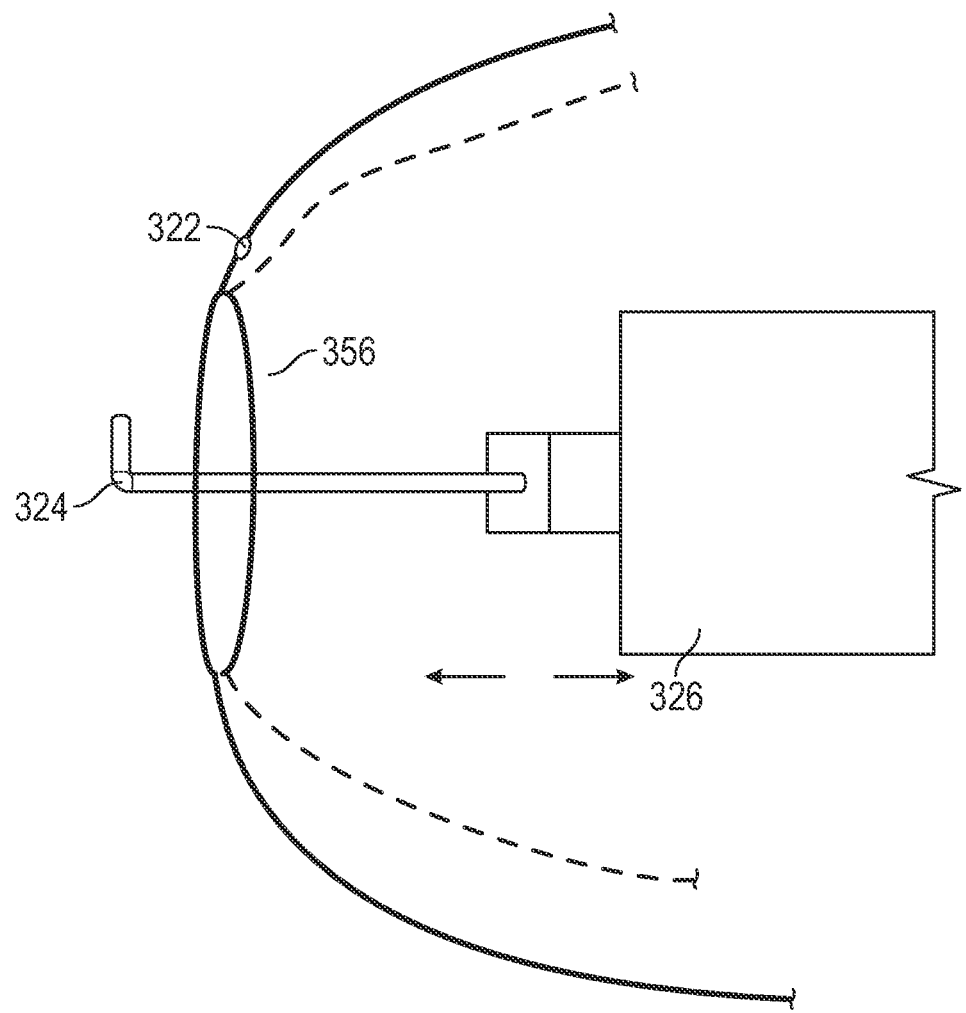
FIG. 7 is another schematic view of the loop forming portion of the knitting system illustrated in FIG. 5.
Figure 8:
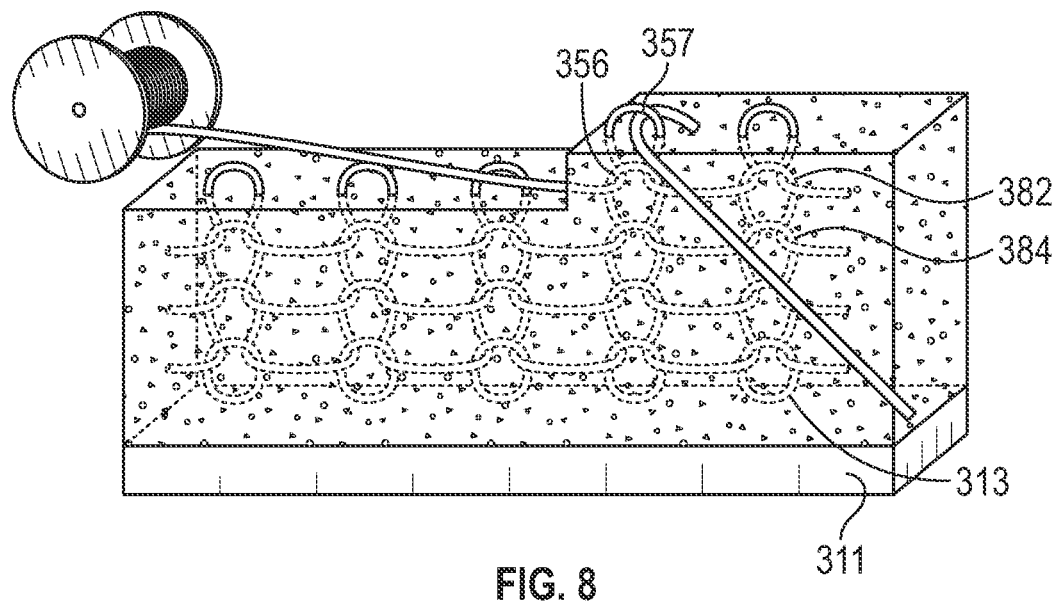
FIG. 8 is a schematic view of a partially printed structure.

Another embodiment of a knitting device is illustrated in FIGS. 5-7 at 300. The knitting device 300 can be utilized with the extrusion system 202 and can be provided with the extrusion system 202 or provided as an accessory to the extrusion system 202, as previously described. The knitting system 300 can be carried by the extrusion gantry or a separate knitting system gantry, as previously disclosed.

The knitting system 300 includes a source 302 of previously described tow material that is suppled to a knitting head 304. The knitting system 300 can be utilized to knit an inter-layer reinforcing network using the tow material. However, the knitting system 300 forms the interlayer reinforcement network as the concrete is extruded as the uppermost layer, instead of forming the course of loops and then extruding the concrete, as discussed above.

The source 302 of reinforcement material is wound on a spool 306, as illustrated in FIG. 5. However, the source of material can also include a reel, a creel or any other suitable source that allows the tow material to be fed to the knitting head 304 in a controlled manner.

To print the structure 350 with periodic loops, a starter piece 311 with spaced apart loops 313 is provided as the starting layer for the tow material 307 to form the periodic loops. In some embodiments the starter piece 311 can be a board or metal strip, and the spaced apart loops 313 can be eye screws.

As the knitting head 304 moves in the direction of arrow 310, the tow material is unwound from the spool 306. As the tow material is unwound, the material 307 passes through an aperture in a guide 308 to properly feed the tow material to the knitting head 304. The tow material then passes through an aperture 312 in an alignment plate 314 that maintains the tow material in proper alignment with the previously knitted loops.

The aperture 312 is located a distance D above a bottom surface 316 of the alignment plate 314. As the knitting head 304 is moved in the direction of arrow 310, the bottom surface 316 either engages a top surface 352 of the structure 350 being printed or is slightly above the top surface 352. The location of the aperture 312 above the bottom surface 316 along with the weight of extruded material 354 on the course of loops 380 being printed maintains the tow material 307 in tension such that the tow material 307 is located approximately the same distance D above the upper surface. With the tow material located approximately the distance D above the top surface of the structure being printed, the tow material is located within the next extruded layer, and not at the interface between layers.

As the knitting head 304 moves in the direction of arrow 310 along an intended toolpath, a first sensor 318 mounted on the alignment plate 314 and senses the presence of a previously formed loop 356 that is extending above the upper surface 352 of the structure 350 being printed. The first sensor 318 sends a signal to the controller to cause the knitting head 304 to align with the loop 356 located proximate a trailing end 320 of the alignment plate 314, and signal the knitting process to occur for that loop. The first sensor 318 can be any suitable sensor including, but not limited to, an optical sensor.

Referring to FIGS. 6-9, a second sensor 322 on the alignment plate 314 locates a position of the tow material 307 though the loop 356. An actuator 326 such as, but not limited to a servo motor, receives a signal based upon the sensed location of the tow material 307 to cause hook shaped device 324 to pass through the loop 356 and pull the tow material 307 through the loop 356 to begin creation of a loop.

The actuator 326 then causes the hook shaped device 324 to raise the tow material 307 upward to engage an arcuate surface 321 proximate the trailing end 320. The arcuate surface 321 acts as a guide to ensure the newly formed loop 357 is a consistent size within a course of loops 382 and between courses of loops 382, 384, such that the reinforcement network is formed of consistently sized loops. Consistently sized loops ensure the straight tow material is located within a layer and at least a portion of the upper-most loops extend above the newly deposited layer of building material.

Once the new loop is formed the knitting head 304 moves in the direction of the arrow 310. However, the hook shaped device 324 remains holding the loop 357 in place as the nozzle 206 passes along behind the knitting head 304 where building material is deposited an uppermost layer 354 which covers the tow material 307 and a portion of the loop 357, while leaving an upper portion of the loop 357 exposed. The weight of the deposition layer holds the loop in its proper location for subsequent knitted layers.

In some instances, the hook shaped device 324 may position the loop 357 in a non-vertical position, to prevent interference with the deposition nozzle 206 as material 354 is deposited about the loop 357. After the nozzle 206 passes the loop 357, the hook shaped device 324 may than manipulate the loop 357 back to a desired location, such as substantially vertical. Upon the partial coverage of an individual loop 357, the hook shaped device 324 is manipulated away from the loop 357, and the concrete 354 retains the loop in the selected position.

Figure 9:
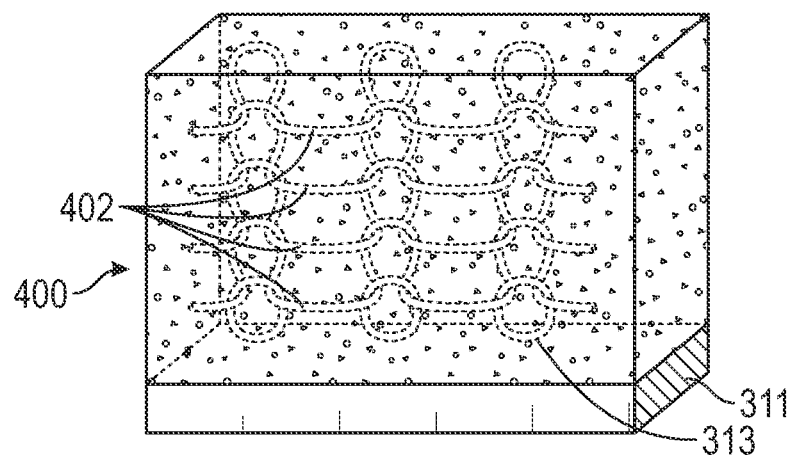
FIG. 9 is a schematic view a printed structure.

Referring to FIG. 9, the process is repeated for each loop in a course of loops to form a layered structure 400 with an interlayer reinforcement network 402 through the layers of the structure 400. As illustrated, the starter piece 311 with the plurality of loops 313 is utilized as the first course of loops. As previously mentions, the number of loops in a course row can be increased or decreased at the ends of the row.

Referring to FIG. 9, when a final course of reinforcement network and layer of material is being formed, there are several options for finishing off the network. A rigid member could be inserted into the top portion of exposed loops to retain the loops in a selected location, and a final pass of material could be applied to cover the reinforcement network inside the structure. The loops may also be left exposed and cut. Additionally, the upper course of loops can be covered without the use of a rigid member. Optionally, a finished edge could be knitted in the top row to retain the upper-most loops together.

Although the present disclosure has been described with reference to preferred embodiments, workers skilled in the art will recognize that changes may be made in form and detail without departing from the spirit and scope of the disclosure.

The invention claimed is:

1. A large-scale additive manufacturing system for printing structures, the system comprising:
   an extrusion system comprising:
      a nozzle configured to receive a supply of structural material and to selectively dispense the structural material in flowable form; and
      a first gantry configured to move the nozzle along toolpaths defined according to a structure to be printed such that structural material may be dispensed along the toolpaths to print a series of structural layers, wherein the series of structural layers bond together to form all or a portion of the structure; and
   a knitting system comprising:
      a tow feeder configured to feed a supply of tow material to a location proximate a current course of loops extending above an upper surface of a current structural layer or extending above a base surface in regions where no structural layer has been printed; and
      a hooking device configured to engage the tow material and bring it through the current course of loops to form a subsequent course of loops interwoven with the current course of loops; and
   a controller configured to operate the knitting system to form additional subsequent courses of loops each interwoven with a current course of loops after each of the series of structural layers are printed, wherein the interwoven courses of loops create a reinforcement network of knitted loops embedded in the structure, and wherein the series of structural layers are tied together.

2. The system of claim 1, wherein the knitting system further comprises:
   an actuator configured to move the hooking device to form the subsequent course of loops interwoven with the current course of loops.

3. The system of claim 1, wherein the knitting system further comprises:
   a cutting device configured to sever the tow material at a selected location.

4. The system of claim 1, and further comprising a supply of tow material selected from one or more of steel, fiberglass or carbon fiber.

5. The system of claim 1, and further comprising:
   one or more rigid members configured to be positioned within all or a portion of a current course of loops; and one or more actuators wherein each actuator moves the one or more rigid members out of the path of the extrusion system and in doing so the one or more rigid members engage with the current course of loops to thereby move the all of a portion of the current course of loops to an offset position such that the extrusion system can dispense a next structural layer without interference from the current course of loops.

6. The system of claim 1, and further comprising a sensor on the tow feeder configured to identify a location of a loop in the current course of loops and responsively send a signal to the controller.

7. The system of claim 1, and further comprising a sensor on the hooking device configured to locate the tow material through a loop in the current course of loops and responsively send a signal to the controller initiating the hooking device to engage the tow material and bring it through the loop.

8. The system of claim 1, wherein the nozzle is configured to form layers ranging from about ¼" to about 3" in thickness.

9. The system of claim 1, wherein the hooking device is a hook-shaped device.

10. The system of claim 1, wherein the structural material comprises concrete.

11. The system of claim 1, and further comprising:
a second gantry configured to move the knitting system based upon signals from the controller.

12. The system of claim 1, wherein the gantry is further configured to move the knitting system based upon signals from the controller.

13. A knitting system configured to be utilized with a large-scale extrusion-based additive manufacturing system for printing a structure in a layer-by-layer manner, the knitting system comprising:
a tow feeder configured to feed a supply of tow material to a location proximate a current course of loops extending above a current structural layer of the structure being printed or extending above a base surface in regions where no structural layer has been printed; and
a hooking device configured to engage the tow material and bring it through the current course of loops to form a subsequent course of loops interwoven with the current course of loops,
wherein the tow feeder and the hooking device are configured to be moved based upon signals from a controller to form additional subsequent courses of loops each interwoven with a current course of loops as each structural layer is printed, wherein the interwoven courses of loops create a reinforcement network of knitted loops embedded in the structure.

14. The system of claim 13, and further comprising a gantry configured to move the tow feeder and the hooking device to create the reinforcement network of knitted loops.

15. The system of claim 13, wherein the knitting system further comprises:
an actuator configured to move the hooking device to form the subsequent course of loops interwoven with the current course of loops.

16. The system of claim 13, wherein the knitting system further comprises:
a cutting device configured to sever the tow material at a selected location.

17. The system of claim 13, wherein the supply of tow material comprises one or more of steel, fiberglass, and carbon-based fiber.

18. The system of claim 13, and further comprising:
one or more sufficiently rigid members configured to be positioned within all or a portion of a current course of loops; and
one or more actuators wherein each actuator moves the one or more sufficiently rigid members to thereby move all of a portion of the current course of loops to an offset position out of an extrusion path such that the additive manufacturing system can print a next structural layer without interference from the current course of loops.

19. The system of claim 13, and further comprising a sensor on the tow feeder configured to identify a location of a loop in the current course of loops and responsively send a signal to the controller.

20. The system of claim 13, and further comprising a sensor on the hooking device configured to locate the tow material through a loop in the current course of loops and responsively send a signal to the controller for initiating the initiating the hooking device to engage the tow material and bring it through the loop.

21. The system of claim 13, and wherein the tow feeder comprises:
a main body having a first end, a second end and a bottom surface;
an aperture within the main body proximate a first end wherein the aperture is a selected distance from a bottom surface of the main body wherein the aperture is configured to pass the tow material therethrough; and
an arcuate surface proximate the second end wherein the arcuate surface is configured to guide the formation of individual loops within the courses of loops.

22. The system of claim 13, and further comprising:
a gantry configured to support and move the tow feeder and the hooking device based upon signals from the controller.

23. A method of printing a large-scale structure in a layer-wise manner, the method comprising the steps of:
providing an existing course of loops;
printing a layer of a structure by extruding one or more flowable structural materials about the existing course of loops such that an upper surface of the layer is at a selected height on the existing course of loops;
knitting a next course of loops to the existing course of loops to form a portion of an internal woven reinforcement network;
printing a next layer of the structure by extruding one or more structural flowable materials about the next course of loops such that an upper surface of the next layer is at a selected height on the next course of loops, wherein the next course of loops extends above the structure being printed and may function as an existing course of loops for subsequent knitting steps; and
repeating the knitting and printing steps to create an internal woven reinforcement network within the printed structure.

24. The method of claim 23, wherein providing an existing course of loops comprises providing a pre-fabricated starter piece with the first course of loops.

25. The method of claim 23, and further comprising cutting the tow material after the next course of loops is formed.

26. The method of claim 23, and further comprising:
moving the existing course of loops to one or more offset locations while performing the printing step so that the next layer may be printed without interference from the portion of the internal woven reinforcement network extending above the structure being printed.

27. The method of claim 26, wherein moving the existing course of loops comprises:
  inserting a sufficiently rigid member through the existing course of loops; and
  moving the sufficiently rigid member with an actuator to move the existing course of loops to the one or more offset locations.

28. The method of claim 23, and further comprising the steps of:
  determining when selected layers cure; and
  tensioning the internal woven reinforcement network until the select layers cure; and
  repeating the determining and tensioning steps as additional layers cure such that at least a portion of the structure is pre-tensioned or pre-stressed when printed.

29. The method of claim 28, wherein the tensioning step comprises:
  inserting a sufficiently rigid member through the existing course of loops; and
  placing a force on the substantially rigid member.

30. The method of claim 23, and further comprising:
  identifying one or more locations of the structure to be reinforced with the internal woven reinforcement network t; and
  knitting the panel of looped courses in the identified one or more locations as the structure is printed in a layer-wise manner.

31. The method of claim 23, wherein the structural material comprises concrete.

32. A method of printing a large-scale structure in a layer-wise manner, the method comprising:
  providing an existing course of loops;
  knitting a tow material through a first loop of the existing course of loops using a hooking device to create a knitted loop;
  covering the tow material with a layer of flowable structural material and embedding the loop while maintaining exposure of the upper portion of the first knitted loop for a subsequent knitted loop;
  repeating the knitting and covering steps to form a first course of loops in a layer of structural material;
  forming a subsequent course of loops knitted to the first course of loops in series to form an additional layer of a woven reinforcement network;
  printing additional layers of the structure about the subsequent course of loops such that an upper surface of the structure is at a selected height on the next course of loops; and
  repeating the knitting and printing steps to create subsequent layers wherein the tow material creates an embedded reinforcement network within the structure.

33. The method of claim 32, and further comprising:
  depositing the flowable material as an extruded layer on top of the tow material such that an upper surface of the structure is at a selected height on the course of loops such that an upper portion of the course of loops is located above the upper surface of the structure being printed.

34. The method of claim 32, wherein the structural material comprises concrete.

35. The method of claim 32, wherein providing the first course of loops comprises:
  providing a starter piece having the first course of loops secured thereto.

36. The method of claim 32, wherein the structural material comprises forming layers ranging from about ¼" to about 3" in thickness.

* * * * *